United States Patent [19]

Ohe et al.

[11] 3,716,505
[45] Feb. 13, 1973

[54] PROCESS FOR SUSPENSION POLYMERIZATION

[75] Inventors: Keitaro Ohe; Daijiro Nishio; Shigeru Sadamtsu; Hiroyuki Kaneko, all of Kanagawa, Japan

[73] Assignee: Fuji Photo Film Co., Ltd., Kanagawa, Japan

[22] Filed: May 22, 1970

[21] Appl. No.: 40,482

[30] Foreign Application Priority Data

May 23, 1969 Japan .................................44/40057

[52] U.S. Cl. ..............260/17 A, 260/17 R, 260/34.2, 260/40 TN, 260/41 A, 260/41 B, 260/41 R, 260/836, 260/859, 260/95
[51] Int. Cl. ................................................C08f 1/11
[58] Field of Search .......260/17 A, 17 R, 41 A, 41 B, 260/41 R, 95, 34.2, 703,878; 241/30

[56] References Cited

UNITED STATES PATENTS

| | | |
|---|---|---|
| 3,198,775 | 8/1965 | Delacretaz et al. ..................260/17 R |
| 3,205,204 | 9/1965 | Heckmaier et al..................260/17 R |
| 3,222,343 | 12/1965 | Ingram et al.........................260/17 R |
| 3,458,603 | 7/1969 | Griffin ..............................260/17 R |
| 2,171,765 | 12/1935 | Rohm et al. .........................260/41 C |
| 2,588,398 | 3/1952 | Mast et al. ........................260/86.1 R |

*Primary Examiner*—William H. Short
*Assistant Examiner*—L. M. Phynes
*Attorney*—Sughrue, Rothwell, Mion, Zinn and Macpeak

[57] ABSTRACT

A process for suspension polymerization of vinyl monomers in an aqueous liquid medium wherein an inorganic compound difficultly soluble in the liquid medium and a resinous substance, having a solubility parameter value of from 7.8 to 16.1 and being soluble in the vinyl monomers are kneaded in advance with the vinyl monomers, and the kneaded mixture is then suspended in the liquid medium to polymerize the vinyl monomers.

8 Claims, No Drawings

PROCESS FOR SUSPENSION POLYMERIZATION

BACKGROUND OF THE INVENTION

1. Field of the Invention

This invention relates to a process for suspension polymerization, and particularly to a process for producing a polymer in the form of finely divided uniform granules or beads.

2. Description of the Prior Art

It has generally been the practice in suspension polymerization to add various dispersing agents to a polymerization system to prevent the resulting polymer from being agglomerated into a mass. The dispersing agents used for this purpose broadly include water-soluble high-molecular-weight compounds and difficultly soluble finely divided inorganic compounds. Of these dispersing agents, the water-soluble high-molecular-weight polymers need to be added only in relatively small amounts and therefore are economically advantageous. But they are adsorbed onto the surface of the resulting polymer particles or grafted to the polymer, thereby the removal of these agents becomes difficult. On the other hand, the sparingly soluble inorganic compounds can be removed relatively easily by dissolving them in an acid or base. However, they need to be used in considerably large amounts for dispersing purposes. Furthermore, the use of the inorganic compounds alone, as described in Japanese Patent Publication No. 537/62, makes it difficult to perform the polymerization stably, resulting in nonuniform spherical polymer particles with irregular sizes. To avoid this, attempts have been made to add stabilizing agents such as surface active agents. These agents, however, are difficult to remove completely from the resulting polymers as is the situation with the water-soluble polymers above.

In any case, according to the processes previously reported, polymer particles obtained usually have an average diameter of 50 microns or more, and 30 microns at the smallest, and it is practically impossible to produce uniform, spherical fine polymer beads having an average diameter of about 10 microns or less stable products.

Our research work conducted in an attempt to produce fine particles of polymer led to the discovery that when a water-insoluble but relatively hydrophilic inorganic compound is forcibly kneaded into a monomeric vinyl compound which is relatively hydrophobic and the kneaded mixture is added then to an aqueous medium, the particles of the inorganic compound migrate to the interface between water and the dispersed phase of the vinyl monomer and exhibit an effective dispersing action. Consequently this procedure results in fine and uniform particles of polymer using small amounts of these inorganic compounds as compared with the prior processes in which difficultly soluble inorganic compounds are added directly to an aqueous medium. This discovery is described in patent application Ser. No. 703,878, filed on Feb. 8, 1968, now abandoned. Further reduction in size of polymer beads could be effected by increasing the amounts of finely divided difficultly soluble inorganic compounds added to the vinyl monomer. But if a monomeric vinyl compound is mixed with fine powders of the difficultly soluble inorganic compound of an amount exceeding a certain limit, the mixture becomes thixotropic, and it becomes difficult to knead and disperse the inorganic compounds or to withdraw them from a kneader.

We have therefore made extensive studies to overcome these difficulties of conventional processes and produce polymers in the form of fine and uniform granules.

Accordingly, an object of the present invention is to provide a process for producing fine and uniform granular polymers.

SUMMARY OF THE INVENTION

The process of this invention comprises subjecting a monomeric composition comprising at least one vinyl monomer to suspension polymerization in an aqueous medium, characterized in that an inorganic compound which is difficultly soluble in such liquid medium and a resinous substance which has a solubility parameter value (SP), as defined hereinbelow, within the range of from 7.8 to 16.1 and is soluble in said monomeric composition are kneaded with said monomeric composition, the kneaded mixture is then suspended in said liquid medium, and the vinyl monomer is polymerized in this state.

DETAILED DESCRIPTION OF THE INVENTION

In the present invention, a resinous substance (hereinafter called a fluidizing agent) is added in advance to a suspension polymerization system of the type disclosed in the patent application mentioned above, thereby remarkably reducing the thixotropy or apparent viscosity of the kneaded mixture and improving the kneaded and dispersed state of the mixture. Thus, the kneading and dispersing operations are rendered commercially feasible and easy so that the desired fine and uniform polymer particles can be produced stably. According to the present invention, a fluidizing agent soluble in a polymerizable vinyl monomer is added to said monomer in an amount of from 0.001 to 10 percent by weight based on said monomer, together with a relatively hydrophilic and difficultly soluble inorganic compound and a polymerization initiator. They are kneaded for a certain period of time in a ball mill, for example. The kneaded mixture withdrawn from the ball mill is suspended in an aqueous medium, and polymerized.

The fluidizing agent used in the present invention is present dissolved in the resulting polymer particles. But it has the marked advantage that sufficient results are obtained with amounts as small as 1 percent or less, and unlike surfactants, the various surface properties, especially electrical characteristics, of the polymer particles upon adsorption thereto, are not adversely affected.

The fluidizing agent, which is the most characteristic component in the present invention, is a resinous substance having a relatively large polarity which has a solubility parameter value (abbreviated SP; see Polymer Handbook, Vol. 4, pages 341–368, John Wiley and Sons (1966)), within the range of from 7.8 to 16.1 and is soluble in the vinyl monomers used. The effective amounts of the fluidizing agent are within the range of from about 0.001 to 10 percent by weight based on the monomer. In commercial-scale operations, however, very small amounts within this range can be used with satisfactory results, and this is an advantageous feature of the process of the invention. The types and amounts of the fluidizing agent are determined according to the combination of the types and amounts of the vinyl monomer, difficultly soluble inorganic compound or other additives.

The above-described fluidizing agent is selected from natural or synthetic resinous substances having a solubility parameter within the range of from 7.8 to 16.1. The SP value is the square root of the cohesive energy density, which is a measure of the intermolecular force, and whether it is large or small corresponds to the polarity of the respective substance. Physically, the cohesive energy density is the amount of energy required to evaporate one cubic centimeter of the liquid (solvent). The SP of the resinous substance used as the fluidizing agent of the present invention is calculated from various physical constants or determined experimentally. Since the former method is effective only on those substances whose composition or structure is known, the latter method is used in most cases in determining the SP. Among the experimental methods are those in which the calculation is made on the basis of solubilities or degrees of swelling. The method considered to be most effective for commercially available resinous substances involves dissolving the resinous substance, intended for use as a fluidizing agent, in many solvents having different SP values, measuring the intrinsic viscosity of the resinous substance in each solvent, and adopting the SP of a solvent which gives the maximum intrinsic viscosity as the SP of the fluidizing agent. In the present invention, the following 22 solvents are used to measure the intrinsic viscosities of fluidizing agents at 25°C, and the SP of a solvent which gives the maximum intrinsic viscosity is defined as the SP of the fluidizing agent.

| Solvents | | Solubility Parameter |
|---|---|---|
| 1. | Diisopropyl Ether | 6.9 |
| 2. | n-Hexane | 7.3 |
| 3. | Diisobutyl Ketone | 7.8 |
| 4. | Cyclohexane | 8.2 |
| 5. | n-Butyl Acetate | 8.5 |
| 6. | Xylol | 8.8 |
| 7. | Methyl Ethyl Ketone | 9.3 |
| 8. | Methylene Chloride | 9.7 |
| 9. | Acetone | 9.9 |
| 10. | Ethylene glycol monoethyl ether | 10.5 |
| 11. | Pyridine | 10.7 |
| 12. | Nitroethane | 11.1 |
| 13. | n-Butanol | 11.4 |
| 14. | Acetonitrile | 11.9 |
| 15. | N,N-Dimethyl Formamide | 12.1 |
| 16. | Ethanol | 12.7 |
| 17. | Nitromethane | 12.7 |
| 18. | Propiolactone | 13.3 |
| 19. | Methanol | 14.5 |
| 20. | Methyl Formamide | 16.1 |
| 21. | Formamide | 19.2 |
| 22. | Water | 23.4 |

The SP of the substance corresponds to the polarity of the substance. As the fluidizing agent suitable for the present invention, relatively polar resinous substances having an SP within the range of from 7.8 to 16.1 are suitable. Examples of such are a cellulose ether resin (having an SP of about 11.4), a polyurethane resin (having an SP of about 10.0), an amino resin (having an SP of about 10.7), an epoxy resin (having an SP of about 13.0), and an alkyd resin (having an SP of about 8.6).

Other components used in the process of the invention are described hereinafter. The monomeric composition of the invention comprises at least one vinyl monomer. Such a vinyl monomer is the starting material for the polymer desired, and specifically includes, for example, styrene, acrylates, methacrylates, vinyl acetate, vinyl chloride, acrylonitrile, and butadiene. When only one vinyl monomer is used, a homopolymer results, and when two or more vinyl monomers are used, copolymers result. The solubilities of these vinyl compounds in water are not more than several percent, and 10 percent at the highest.

The medium in which the suspension polymerization of these vinyl compounds is carried out is an aqueous liquid medium, such as water or a mixture of water and a water-soluble liquid. The solubilities of the vinyl compounds in the mixed medium are the same as the solubilities in water.

The inorganic compounds difficultly soluble in the aqueous liquid medium preferably have a high hydrophilicity. These compounds specifically include, for example, metal powders, carbonates, phosphates, halides, oxides, sulfides, sulfates or hydroxides of Mg, Ca, Zn, Fe, Co, Ni, Al, Si, Ti, Mn, Cd, Ag, Hg, or Ba, for example, $MgCO_3$, $MgHPO_4$, $CaCO_3$, $MnCO_3$, $CaSO_4$, $BaSO_4$, $MgO$, $TiO_2$, $FeO$, $Fe_2O_3$, $ZnO$, $Al_2O_3$, $CuO$, $SiO_2$, $PbO$, $CuS$, $AgS$, $CdS$, $HgS$, $AgCl$, $HgCl_2$, $PbCl_2$, $Ca(OH)_2$, $Al_2(OH)_3$, or $Fe(OH)_2$. These inorganic compounds have a solubility in water of not more than 10 percent and are capable of being present as particles in an aqueous medium. The average size of these particles is less than several microns, preferably less than 1 micron. These inorganic compounds are used in amounts of from 10 to 300 percent by weight based on the weight of the vinyl monomer.

As in the conventional processes, the above-mentioned kneaded system, if desired, can contain molecular weight regulating agents, light resistance improving agents, discoloration inhibitors, processability improving agents, coloring pigments, or dyestuffs.

The inorganic compound is present in the as-obtained polymer in a manner so as to cover the surfaces of the polymer beads. If desired, the inorganic compound can be removed by treatment with a suitable acid or base, or by washing with water and then drying. Thus, there can be obtained fine and uniform polymer beads.

The invention will now be illustrated by the following working examples which are intended to be exemplary and not limitative.

EXAMPLE 1

Each of the compositions shown in Table 1 was kneaded in a ball mill.

TABLE 1

| Sample No. | Sample Formulators (Parts by Weight) | | | |
|---|---|---|---|---|
| | 1 | 2 | 3 | 4 |
| Vinyl Monomer | | | | |
| Styrene (20) | | | | |
| Methyl Methacrylate (80) | 100 | 100 | 100 | 100 |
| Polymerization Initiator | | | | |
| Benzoyl Peroxide | 2 | 2 | 2 | 2 |
| Inorganic Compound (dispersing agent) | | | | |
| Zinc Oxide Powder | 150 | 150 | 50 | 50 |
| Resinous Substance (fluidizing agent) | | | | |

| | | |
|---|---|---|
| Ethyl Cellulose N-10 */ | 0.3 | 0.01 |

* An ethyl cellulose produced by the Hercules Powder Co., having an ethoxyl content of 47.5–49.0 percent, having a viscosity at 5 percent concentration by weight of 10 cps. and having an SP of 11.4

The kneaded liquid was withdrawn from the ball mill. Samples Nos. 1 and 3 were difficult to remove from the mill because of the lack of flowability in the absence of a fluidizing agent. Sample No. 1 could not be withdrawn completely from the mill. Furthermore, agglomerated particles of the zinc oxide were observed, and they readily separated from the monomer. On the other hand, Samples Nos. 2 and 4 which contained the fluidizing agent were sufficiently flowable, and could be withdrawn easily from the mill. The zinc oxide particles were well dispersed with hardly any formation of agglomerated particles, and the liquid was stable.

Each of Samples Nos. 2, 3 and 4 was put into a polymerization vessel provided with a high speed stirrer to which 500 parts by weight of water had been added in advance, while operating the stirrer. The mixture was heated to 90°C, and polymerized for 5 hours, followed by cooling. The zinc oxide was dissolved by the addition of 600 parts (for Sample No. 2) of hydrochloric acid and 200 parts (for Sample Nos. 3 and 4) of hydrochloric acid. The polymerization product was washed with water and the water removed by means of a centrifugal separator, and then dried using a flush drier. Very fine and uniformly spherical polymer beads were obtained. The withdrawn state of the kneaded mixture from the ball mill and the diameters of the obtained polymer particles are shown in Table 2.

TABLE 2

| Sample No. | 1 | 2 | 3 | 4 |
|---|---|---|---|---|
| Withdrawn State of the Kneaded Mixture from the Ball Mill | | | | |
| Flowability and Withdrawability | bad | good | bad | good |
| Viscosity (CP) | >50000 | 1800 | 35000 | 400 |
| Grind Gauge (particles) (mil) | >4.0 | 0 | 3.5 | 0 |
| Polymer Particle Diameter | | | | |
| Average Diameter (micron) | | 4 | 40 | 8.5 |
| Particle Diameter Distribution (micron) | | 2–7 | 5–70 | 2–15 |

As can be seen from the results obtained that the effect of the fluidizing agent was very remarkable.

EXAMPLE 2

Each of the compositions shown in Table 3 was kneaded in a ball mill.

TABLE 3

(Parts by weight)

| Sample No. | 5 | 6 |
|---|---|---|
| Vinyl Monomer | | |
|   Methyl Methacrylate | 100 | 100 |
| Plasticizer | | |
|   Dibutyl Phthalate | 20 | 20 |
| Polymerization Initiator | | |
|   Benzoyl Peroxide | 2 | 2 |
| Dispersing Agent | | |
|   Basic Magnesium Carbonate | 100 | 100 |
| Fluidizing Agent | | |
|   UVAN 32 * | | 0.2 |

* Butylated urea melamine resin manufactured by Toyo Koatsu Industry, Inc. (The intrinsic viscosity of UVAN 32 in a solvent is, for instance, 0.057 in acetone having an SP of 9.9, 0.078 in pyridine having an SP of 10.7, 0.076 in n-butanol having an SP of 11.4, and 0.060 in ethanol having an SP of 12.7. From these viscosity values, the SP of UVAN 32 was found to be 10.7.)

Withdrawal of the kneaded mixture of Sample No. 5 was difficult because of insufficient flowability, and the magnesium carbonate was prone to separate from the monomer. In contrast, the kneaded Sample No. 6 was sufficiently flowable, and could be readily removed from the ball mill. Also, the liquid was in a stable condition. Each of these samples was polymerized in the same manner as in Example 1 to form fine spherical particles of the polymer. The withdrawn state of the kneaded mixture from the ball mill and the diameters of the obtained polymer particles are shown in Table 4.

TABLE 4

| Sample No. | 5 | 6 |
|---|---|---|
| Withdrawn State of the Kneaded Mixture from the Ball Mill | | |
| Flowability and Withdrawability | bad | good |
| Viscosity (CP) | 40000 | 350 |
| Grind Gauge (particles) (mil) | 4.0 | 0 |
| Polymer Particle Diameter | | |
| Average Diameter (microns) | 35 | 11 |
| Particle Diameter Distribution (microns) | 5–100 | 2–15 |

As can be seen from the results obtained, the addition of 0.2 percent, calculated as the solids content of UVAN 32 varnish as the fluidizing agent proved to be markedly effective.

EXAMPLE 3

| | |
|---|---|
| Styrene | 70 parts (by weight) |
| n-Butyl Methacrylate | 30 |
| Azobisisobutyronitrile | 4 |
| Carbon Black | 10 |
| Calcium Phosphate | 100 |
| "OLESTER-F78-50X Varnish" (product of Toyo Koatsu Industry, Inc.) | 0.1 |

These compounds were kneaded together, and then polymerized in the same manner as described in Example 1. The flowability of the kneaded mixture was sufficient, and it was easy to withdraw it from the ball mill. The polymer obtained was in the form of black, spherical particles having an average diameter of 15 microns. "Olester-F7850X" is a polyurethane type resin having an SP of 10.0.

What is claimed is:

1. In a process for producing a granular polymer by suspension polymerization, which comprises kneading a monomeric composition consisting essentially of
   a. at least one vinyl monomer, and
   b. a vinyl monomer polymerization initiator, the improvement which comprises:
   kneading into said monomeric composition, the following:
   c. small particles of an inorganic compound, having a solubility in water of not more than 10 percent, and
   d. a resinous substance, acting as a fluidizing agent, having a solubility parameter value within the range of from 7.8 to 16.1 and being soluble in said monomeric composition, and
   subsequently kneading said composition and then suspending the kneaded composition in an aqueous liquid medium to polymerize the vinyl monomer.

2. A process according to claim 1 wherein said resinous substance is a relatively polar resin selected from the group consisting of cellulose ether resins, polyurethane resins, amino resins, epoxy resins and alkyd resins.

3. A process according to claim 2 wherein said resinous substance is used in an amount of 0.001 to 10 percent by weight based on the vinyl monomer.

4. A process according to claim 3 wherein said resinous substance is used in an amount of 0.001 to 1 percent by weight based on the vinyl monomer.

5. A process according to claim 2 wherein said inorganic compound is present in an amount of from 10 to 300 percent by weight based on the weight of the vinyl monomer.

6. A process according to claim 2 wherein the polymer particle obtained has an average diameter of 15 microns or less.

7. A process according to claim 2 wherein said resinous substance is cellulose ether resin.

8. A process according to claim 7 wherein said cellulose ether resin is ethyl cellulose.

* * * * *